US009544812B2

(12) United States Patent
Grinshpun et al.

(10) Patent No.: US 9,544,812 B2
(45) Date of Patent: Jan. 10, 2017

(54) SYSTEM AND METHOD FOR MITIGATING NETWORK CONGESTION USING FAST CONGESTION DETECTION IN A WIRELESS RADIO ACCESS NETWORK (RAN)

(71) Applicants: Edward Grinshpun, Murray Hill, NJ (US); Qi Liao, Stuttgart (DE); David Faucher, Murray Hill, NJ (US); Zulfiquar Sayeed, Highstown, NJ (US); Sameer Sharma, Murray Hill, NJ (US)

(72) Inventors: Edward Grinshpun, Murray Hill, NJ (US); Qi Liao, Stuttgart (DE); David Faucher, Murray Hill, NJ (US); Zulfiquar Sayeed, Highstown, NJ (US); Sameer Sharma, Murray Hill, NJ (US)

(73) Assignees: Alcatel Lucent, Boulogne-Billancourt (FR); Alcatel-Lucent USA Inc., Murray Hill, NJ (US)

( * ) Notice: Subject to any disclaimer, the term of this patent is extended or adjusted under 35 U.S.C. 154(b) by 152 days.

(21) Appl. No.: 14/610,565

(22) Filed: Jan. 30, 2015

(65) Prior Publication Data
US 2016/0227434 A1     Aug. 4, 2016

(51) Int. Cl.
H04W 4/00     (2009.01)
H04W 28/02    (2009.01)

(52) U.S. Cl.
CPC ..... *H04W 28/0289* (2013.01); *H04W 28/0231* (2013.01); *H04W 28/0278* (2013.01); *H04W 28/02* (2013.01)

(58) Field of Classification Search
CPC ............ H04W 28/02; H04W 28/0289; H04W 28/0231; H04W 28/0278
(Continued)

(56) References Cited

U.S. PATENT DOCUMENTS

2003/0126233 A1  7/2003 Bryers et al.
2006/0056447 A1* 3/2006 Farnsworth ........... H04W 48/08
                                                      370/466
(Continued)

OTHER PUBLICATIONS

"3rd Generation Partnership Project; Technical Specification Group Services and System Aspects; Study on System Enhancements for User Plane Congestion Management (Release 13)." *3GPP TR 23.705*, Section 6.1.5.2, pp. 24-30.
(Continued)

*Primary Examiner* — Farah Faroul
(74) *Attorney, Agent, or Firm* — Harness, Dickey & Pierce, P.L.C.

(57) ABSTRACT

Fast congestion detection is implemented in a wireless radio access network (RAN) to mitigate congestion by classifying bearers into bearer types using bearer metrics and monitoring bearers for type specific anomalies to obtain anomaly data. Congestion is detected based on the anomaly data to obtain congestion information that is exported to a network node to mitigate network congestion. Bearer metrics include radio link protocol (RLC) buffer size information, physical resource block (PRB) utilization information, and transmission burst interval information. The transmission burst interval information includes information on time intervals between successive time periods when a RLC buffer is empty. The bearers are classified into Type I and Type II bearers. Type I bearers are bearers displaying bursty data transfer behavior, and Type II bearers are bearers displaying a continuous stream of data transfer behavior.

20 Claims, 9 Drawing Sheets

(58) Field of Classification Search
USPC .......................................................... 370/230
See application file for complete search history.

(56) References Cited

U.S. PATENT DOCUMENTS

| | | | |
|---|---|---|---|
| 2009/0052330 A1* | 2/2009 | Matsunaga | H04L 1/0019 370/242 |
| 2014/0341109 A1 | 11/2014 | Cartmell et al. | |
| 2015/0334737 A1* | 11/2015 | Susitaival | H04W 72/1284 370/329 |
| 2016/0050653 A1* | 2/2016 | Rastogi | H04W 72/0406 455/453 |
| 2016/0095126 A1* | 3/2016 | Sridhar | H04W 28/02 370/328 |
| 2016/0174219 A1 | 6/2016 | Patil et al. | |
| 2016/0234715 A1* | 8/2016 | Futaki | H04W 48/06 |

OTHER PUBLICATIONS

"3rd Generation Partnership Project; Technical Specification Group Services and System Aspects; Policy and Charging Control Architecture (Release 13)," *3GPP TS 23.203*.

Office Action from co-pending U.S. Appl. No. 14/610,598, dated Nov. 9, 2016.

\* cited by examiner

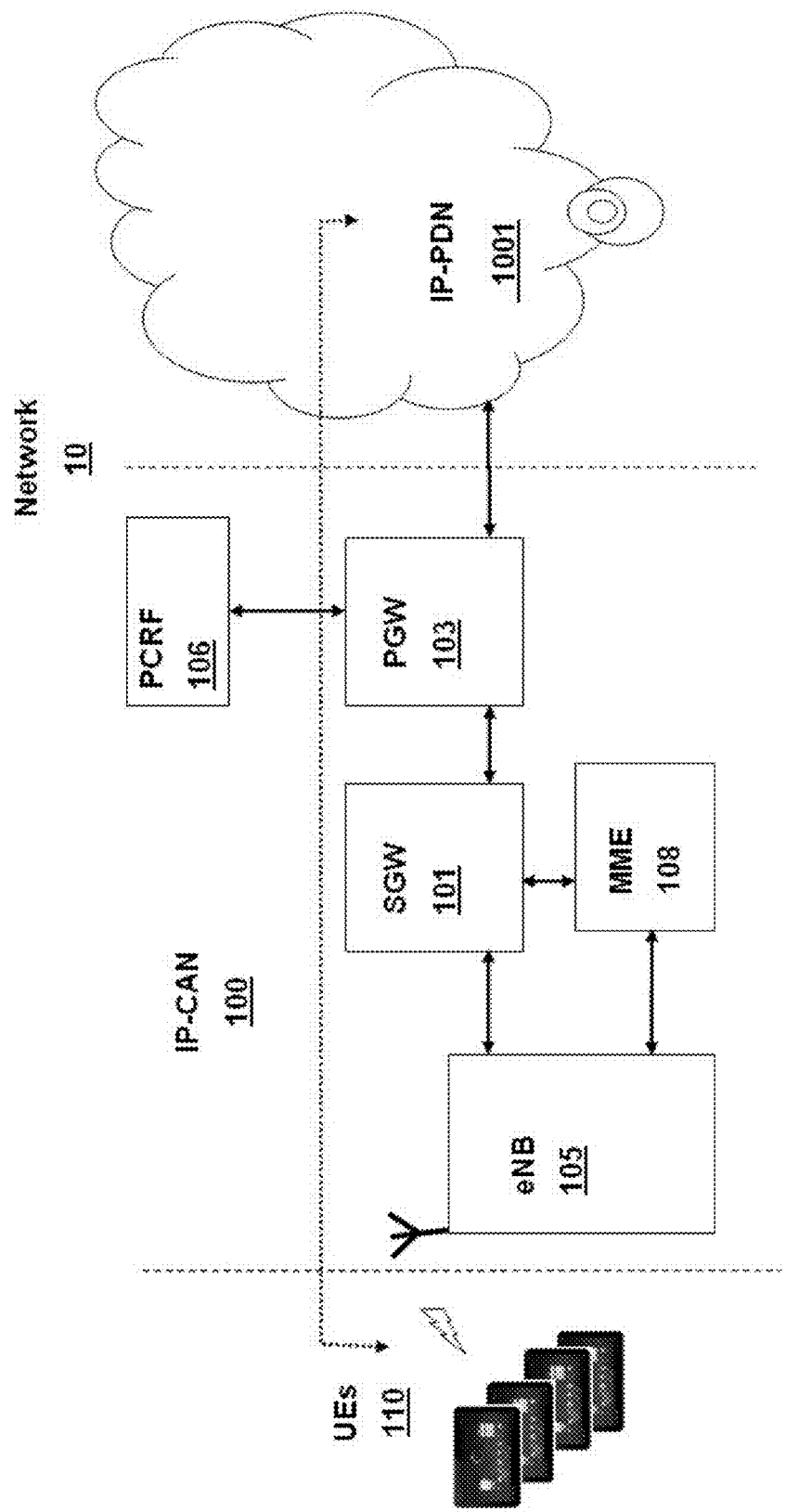
FIG. 1 (CONVENTIONAL)

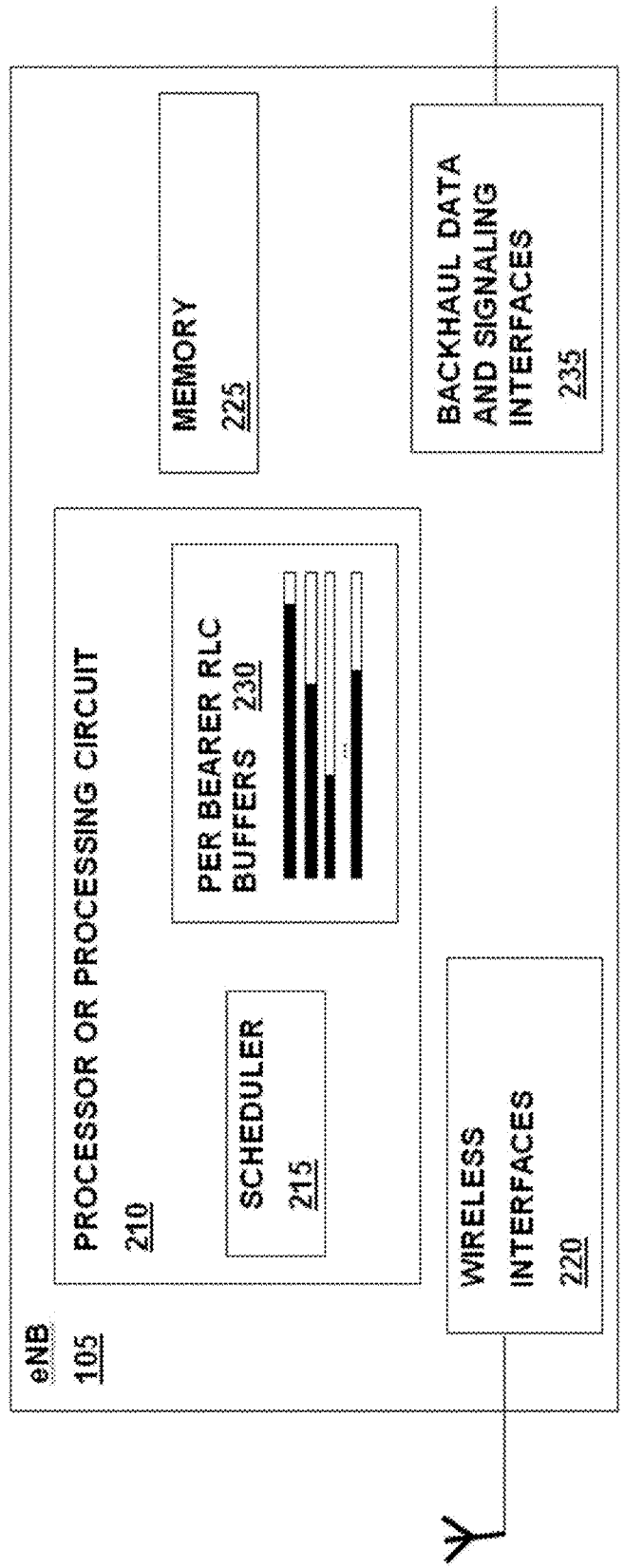
FIG. 2 (CONVENTIONAL)

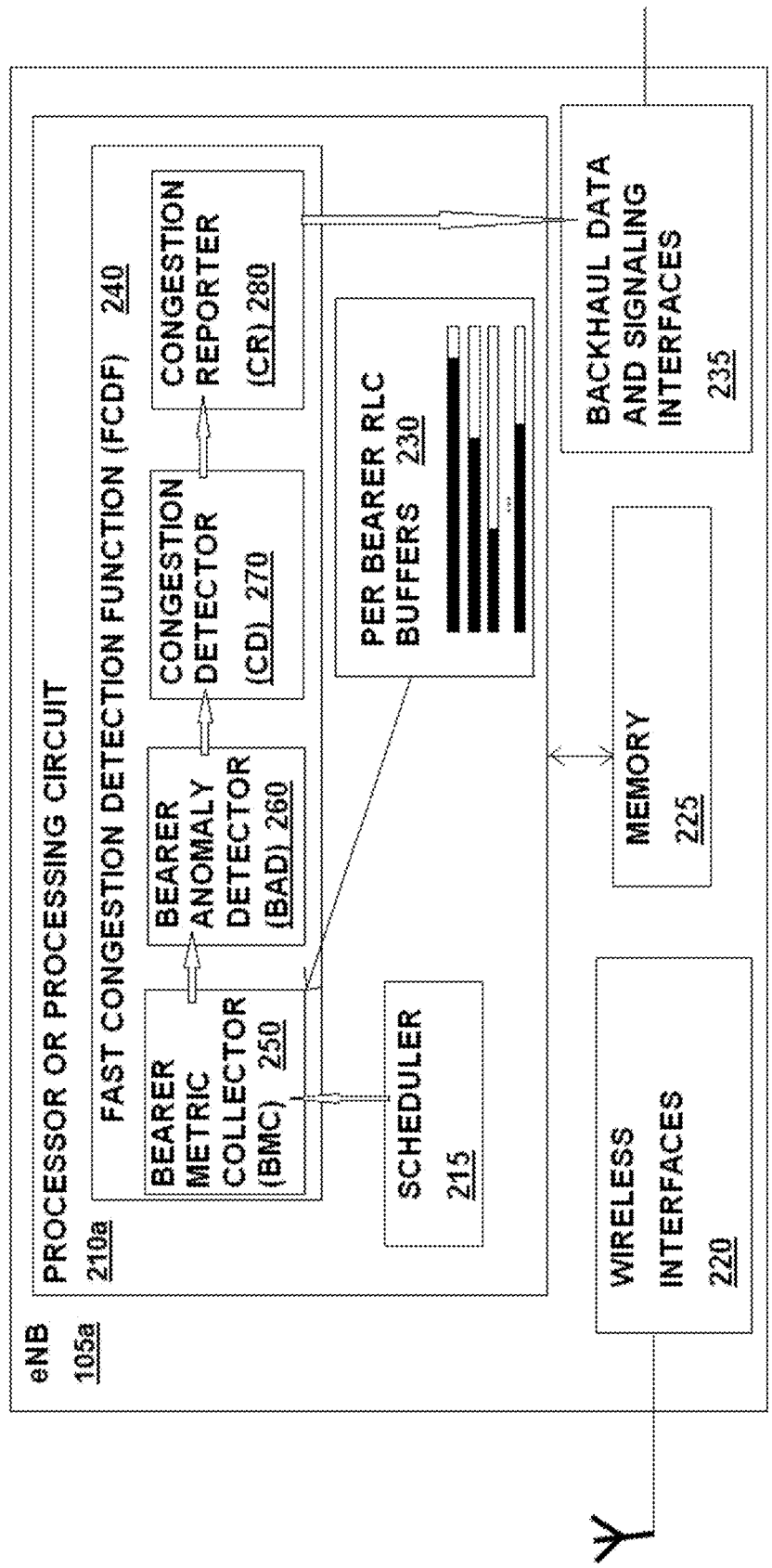
FIG. 3  eNodeB with added Fast Congestion Detection Function (FCDF)

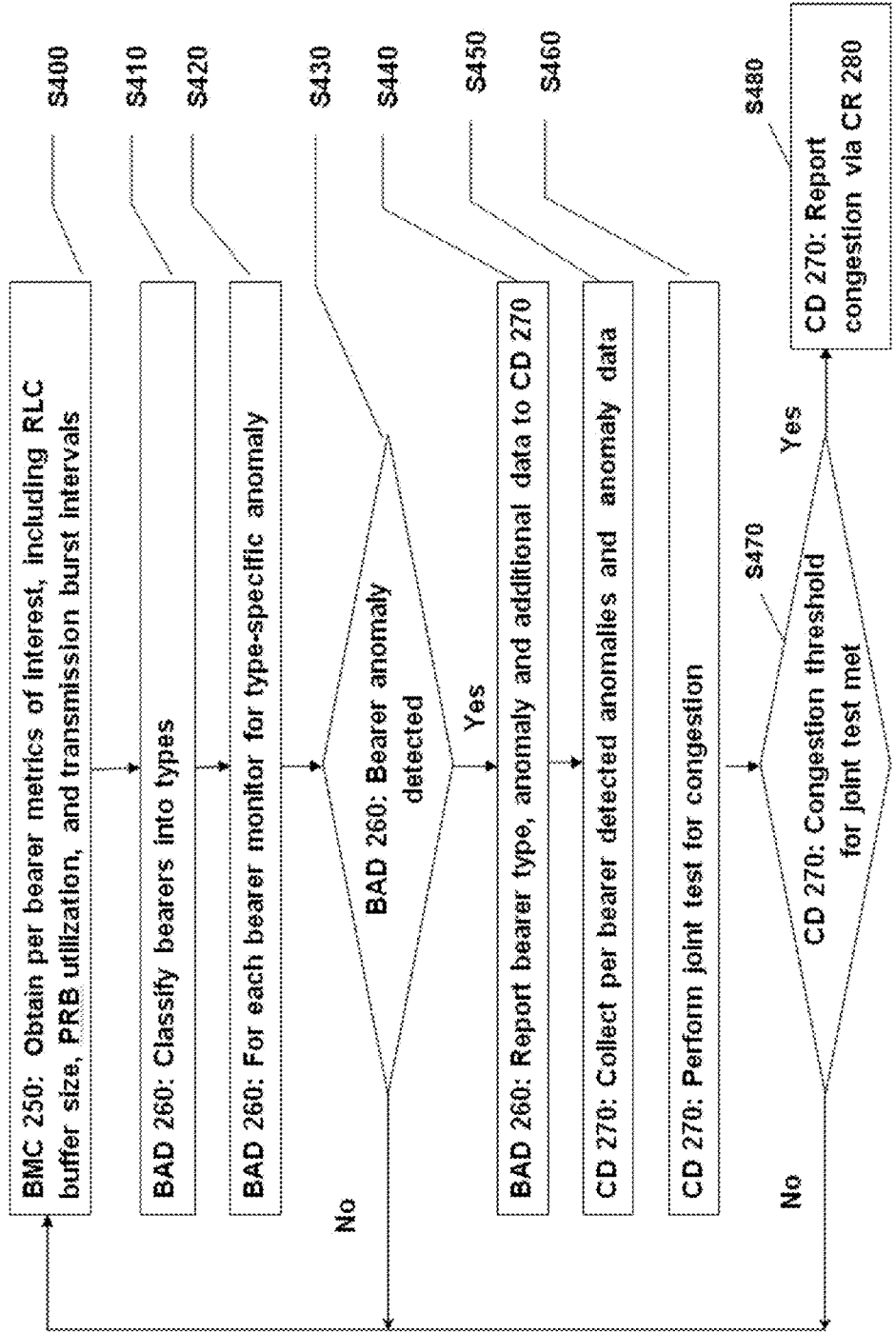
FIG. 4  Operation of Fast Congestion Detection Function (FCDF)

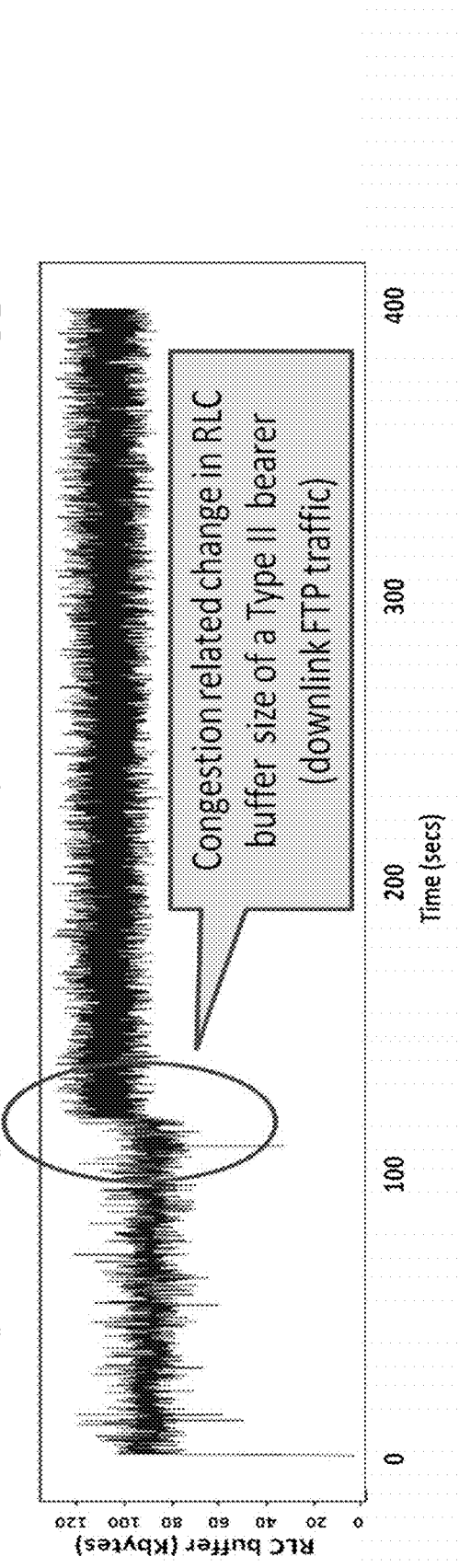
FIG. 5 Example of congestion related change in $X_k^1$ metric for a Type II bearer

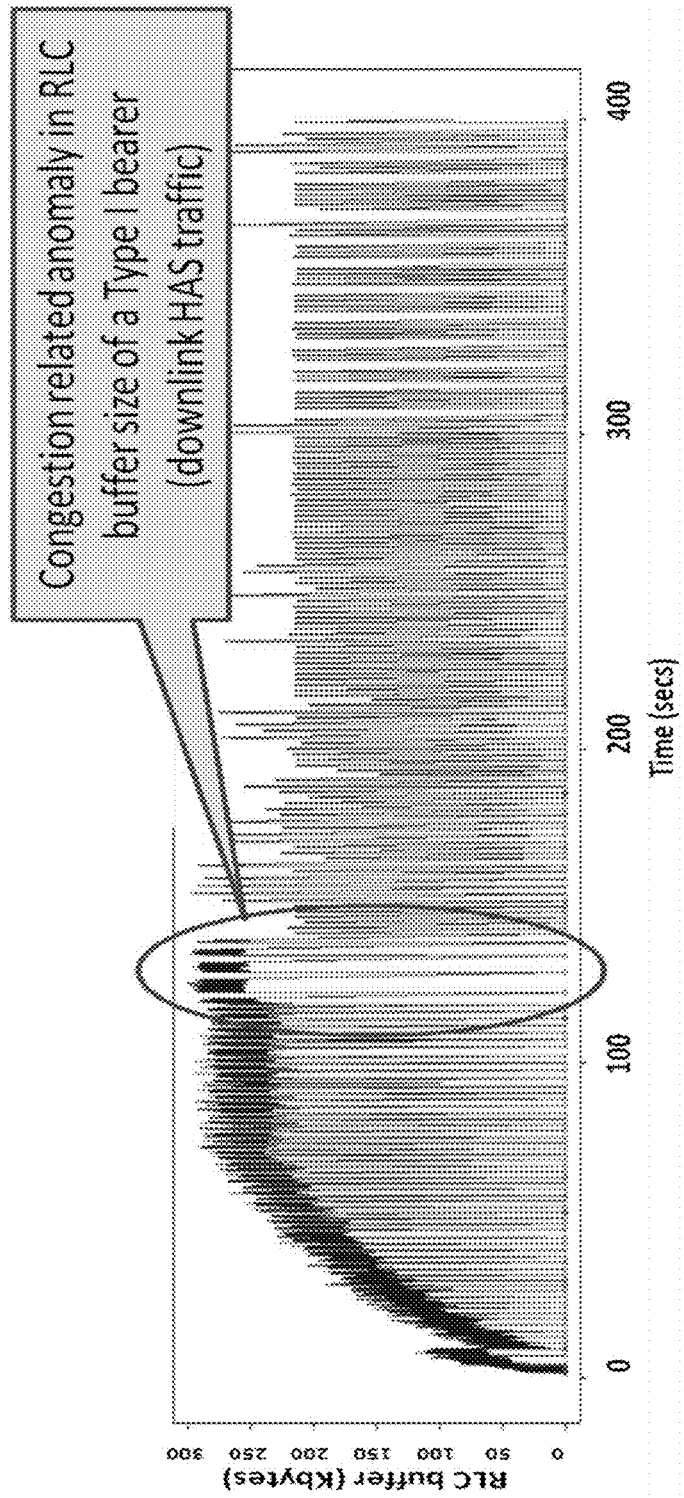
FIG. 6 Example of congestion related change in $X_k^1$ metric for a Type I bearer

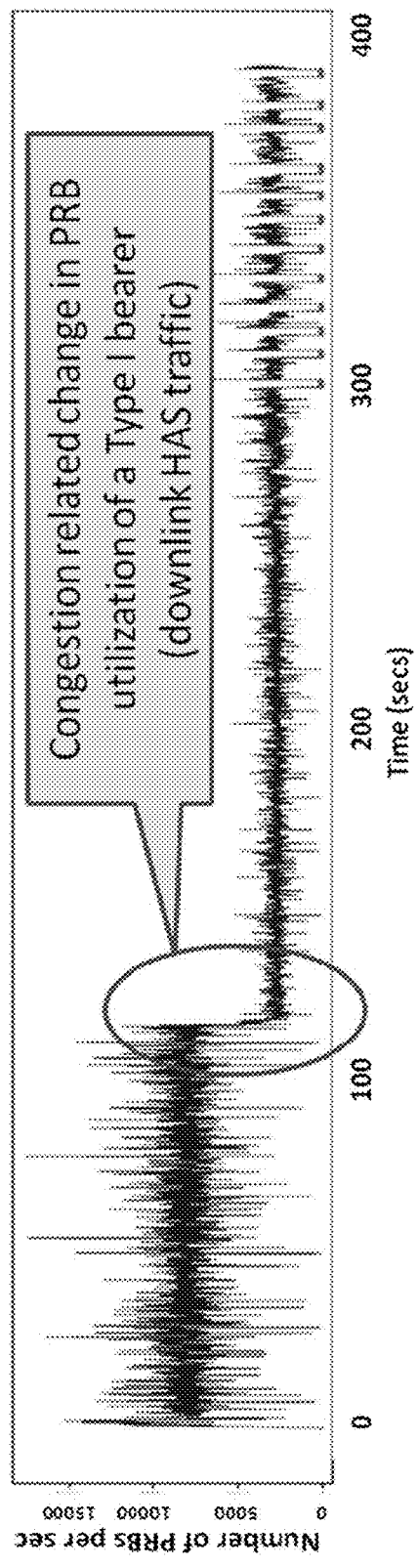
FIG. 7 Example of congestion related change in $X_k^2$ metric for a Type I bearer

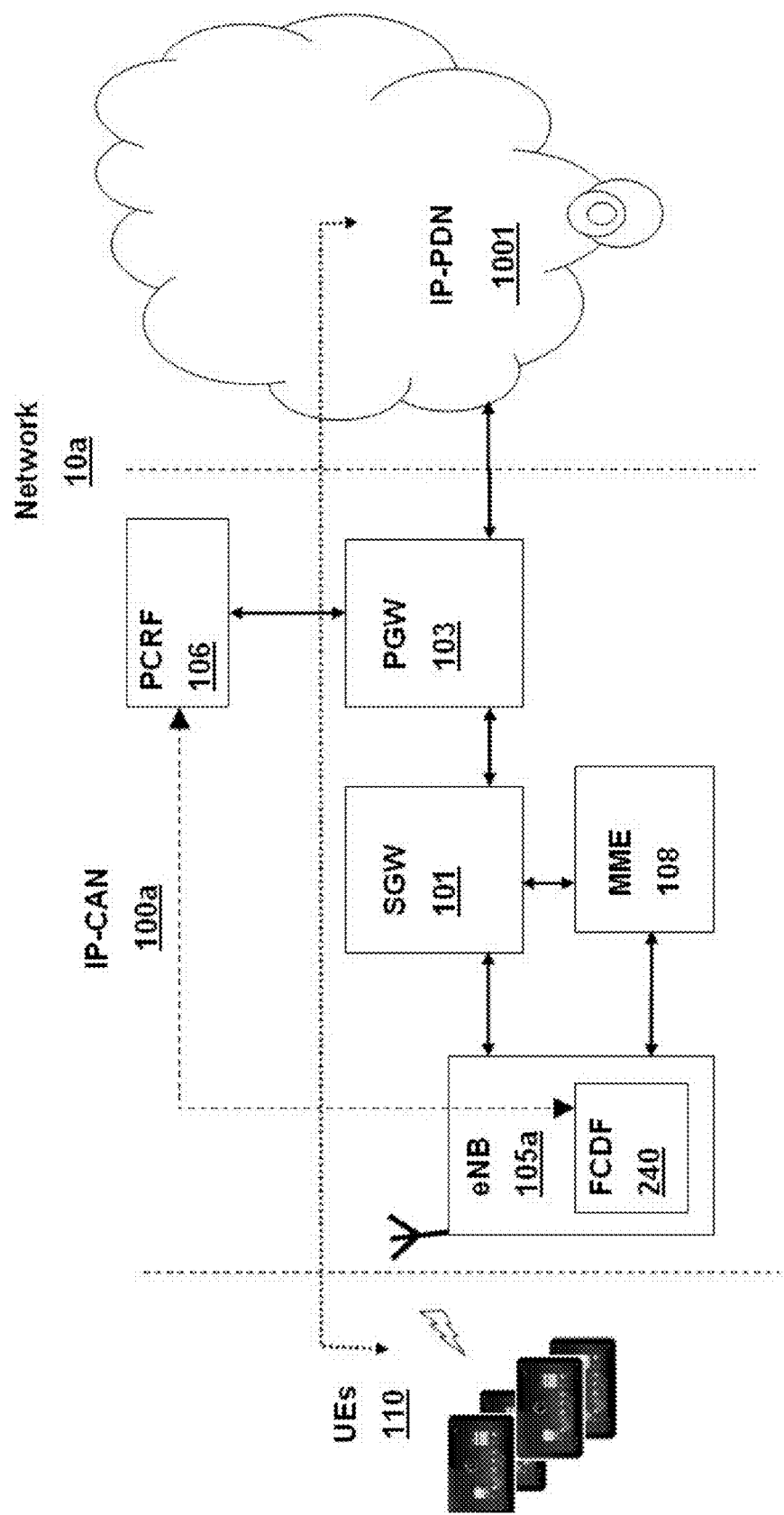
FIG. 8. LTE network with FCDF in eNodeB

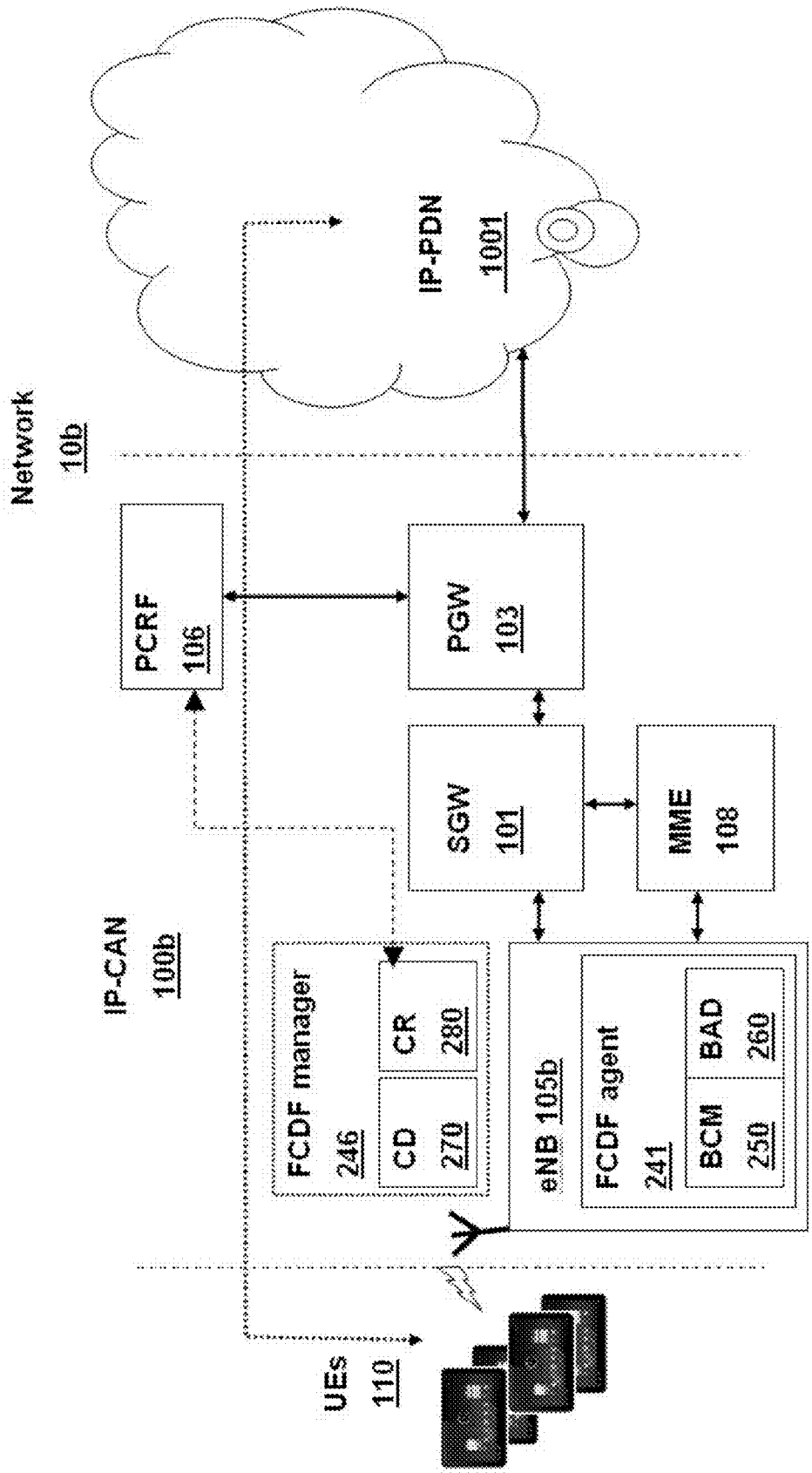
FIG. 9. LTE network with distributed FCDF

SYSTEM AND METHOD FOR MITIGATING NETWORK CONGESTION USING FAST CONGESTION DETECTION IN A WIRELESS RADIO ACCESS NETWORK (RAN)

BACKGROUND OF THE INVENTION

Field of the Invention

Example embodiments relate generally to a system and method for congestion detection that is capable of more quickly identifying congestion within a wireless radio access network (RAN) in order to mitigate network congestion.

Related Art

FIG. 1 illustrates a conventional 3$^{rd}$ Generation Partnership Project Long-Term Evolution (3GPP LIE) network 10. The network 10 includes an Internet Protocol (IP) Connectivity Access Network (IP-CAN) 100 and an IP Packet Data Network (IP-PDN) 1001. The IP-CAN 100 generally includes: a serving gateway (SGW) 101; a packet data network (PDN) gateway (PGW) 103; a policy and charging rules function (PCRF) 106; a mobility management entity (MME) 108 and E-UTRAN Node B (eNB) 105 (i.e., base station, for the purposes herein the terms base station and eNB are used interchangeably). Although not shown, the IP-PDN 1001 portion of the EPS may include application or proxy servers, media servers, email servers, etc.

Within the IP-CAN 100, the eNB 105 is part of what is referred to as an Evolved Universal Mobile Telecommunications System (UMTS) Terrestrial Radio Access Network (EUTRAN), and the portion of the IP-CAN 100 including the SGW 101, the PGW 103, the PCRF 106, and the MME 108 is referred to as an Evolved Packet Core (EPC). Although only a single eNB 105 is shown in FIG. 1, it should be understood that the EUTRAN may include any number of eNBs. Similarly, although only a single SGW, PGW and MME are shown in FIG. 1, it should be understood that the EPC may include any number of these core network elements.

The eNB 105 provides wireless resources and radio coverage for one or more user equipments (UEs) 110. That is to say, any number of UEs 110 may be connected (or attached) to the eNB 105. The eNB 105 is operatively coupled to the SGW 101 and the MME 108.

The SGW 101 routes and forwards user data packets, while also acting as the mobility anchor for the user plane during inter-eNB handovers of UEs. The SGW 101 also acts as the anchor for mobility between 3$^{rd}$ Generation Partnership Project Long-Term Evolution (3GPP LTE) and other 3GPP technologies. For idle UEs 110, the SGW 101 terminates the downlink data path and triggers paging when downlink data arrives for UEs 110.

The PGW 103 provides connectivity between UE 110 and the external packet data networks (e.g., the IP-PDN) by being the point of entry/exit of traffic for the UE 110. As is known, a given UE 110 may have simultaneous connectivity with more than one PGW 103 for accessing multiple PDNs.

The PGW 103 also performs policy enforcement, packet filtering for UEs 110, charging support, lawful interception and packet screening, each of which are well-known functions. The PGW 103 also acts as the anchor for mobility upon SGW relocation during handovers within LTE network, as well as between 3GPP and non-3GPP technologies, such as Worldwide Interoperability for Microwave Access (WiMAX) and 3$^{rd}$ Generation Partnership Project 2 (3GPP2 (code division multiple access (CDMA) 1× and Enhanced Voice Data Optimized (EvDO)).

Still referring to FIG. 1, eNB 105 is also operatively coupled to the MME 108. The MME 108 is the control-node for the EUTRAN, and is responsible for idle mode UE 110 paging and tagging procedures including retransmissions. The MME 108 is also responsible for choosing a particular SGW for a UE during initial attachment of the UE to the network, and during intra-LTE handover involving Core Network (CN) node relocation. The MME 108 authenticates UEs 110 by interacting with a Home Subscriber Server (HSS), which is not shown in FIG. 1.

Non Access Stratum (NAS) signaling terminates at the MME 108, and is responsible for generation and allocation of temporary identities for UEs 110. The MME 108 also checks the authorization of a UE 110 to camp on a service provider's Public Land Mobile Network (PLMN), and enforces UE 110 roaming restrictions. The MME 108 is the termination point in the network for ciphering/integrity protection for NAS signaling, and handles security key management.

The MME 108 also provides control plane functionality for mobility between LTE and 2G/3G access networks with an S3 type of interface from the SGSN (not shown) terminating at the MME 108.

The Policy and Charging Rules Function (PCRF) 106 is the entity that makes policy decisions and sets charging rules. It has access to subscriber databases and plays a role in the 3GPP architecture as specified in 3GPP TS 23.203 "Policy and Charging Control Architecture."

FIG. 2 illustrates a conventional E-UTRAN Node B (eNB) 105. The eNB 105 includes: a memory 225; a processor 210; a scheduler 215; wireless communication interfaces 220; radio link control (RLC) buffers 230 for each bearer; and a backhaul interface 235. The processor or processing circuit 210 controls the function of eNB 105 (as described herein), and is operatively coupled to the memory 225 and the communication interfaces 220. While only one processor 210 is shown in FIG. 2, it should be understood that multiple processors may be included in a typical eNB 105. The functions performed by the processor may be implemented using hardware. Such hardware may include one or more Central Processing Units (CPUs), digital signal processors (DSPs), application-specific-integrated-circuits, field programmable gate arrays (FPGAs) computers or the like. The term processor, used throughout this document, may refer to any of these example implementations, though the term is not limited to these examples. With a Virtual Radio Access Network (VRAN) architecture various functions eNB components may be distributed across multiple processing circuits and multiple physical nodes within VRAN cloud.

The eNB 105 may include one or more cells or sectors serving UEs 110 within individual geometric coverage sector areas. Each cell individually may contain elements depicted in FIG. 2. Throughout this document the terms eNB, cell or sector shall be used interchangeably.

Still referring to FIG. 2, the communication interfaces 220 include various interfaces including one or more transmitters/receivers connected to one or more antennas to wirelessly transmit/receive control and data signals to/from UEs 110, or via a control plane. Backhaul interface 235 is the portion of eNB 105 that interfaces with SGW 101, MME 108, other eNBs, or interface to other EPC network elements and/or RAN elements within IP-CAN 100. The scheduler 215 schedules control and data communications that are to be transmitted and received by the eNB 105 to and from UEs 110. The memory 225 may buffer and store data that is being processed at eNB 105, transmitted and received to and from eNB 105.

Every Transmission Time Interval (TTI), typically equal to 1 millisecond, the scheduler 215 may allocate a certain number of Physical Resource Blocks (PRBs) to different bearers carrying data over the wireless link in the Downlink direction (i.e., transmitting buffered data, located in buffer 230, from eNB 105 to UE 110) and Uplink direction (i.e., receiving data at eNB 105 from UE 110, which is received over backhaul 235, and placed in buffer 230). A "bearer" may be understood to be a virtual link, channel, or data flow used to exchange information for one or more applications on the UE 110. The scheduler 215 may determine Modulation and Coding Schema (MCS) that may define how many bits of information may be packed into the allocated number of PRBs. The latter is defined by the 3GPP TS36.213 tables 7.1.7.1-1 and 7.1.7.2.1-1 (the contents of which is incorporated by reference in its entirety), which presents a lookup table for a number of bits of data that may be included in PRBs sent per TTI for a given allocated number of PRBs and a MCS value. MCS is computed by the scheduler using Channel Quality Indicator (CQI) values reported by the UE 110 that in turn may be derived from measured UE 110 wireless channel conditions in the form of Signal to Interference and Noise Ratio (SINR).

Scheduler 215 may make PRB allocation decisions based upon a Quality of Service (QoS) Class Identifier (QCI), which represents traffic priority hierarchy. There are nine QCI classes currently defined in LTE, with 1 representing highest priority and 9 representing the lowest priority. QCIs 1 to 4 are reserved for Guaranteed Bitrate (GBR) classes for which the scheduler maintains certain specific data flow QoS characteristics. QCIs 5 to 9 are reserved for various categories of Best Effort traffic.

While the scheduler 215 operations are not standardized, there are certain generic types of schedulers that are generally accepted. Examples include strict priority scheduler (SPS) and proportional weighted fair share scheduler (PWFSS). Both types try to honor GBR needs first by allocating dedicated resources to meet whenever possible the GBR bearer throughput constraints while leaving enough resources to maintain certain minimal data traffic for non-GBR classes. The SPS allocates higher priority classes with the resources that may be needed (except for a certain minimal amount of resources to avoid starving lower priority classes), and lower priority classes generally receive the remaining resources. The PWFSS gives each non-GBR QCI class certain weighted share of resources that may not be exceeded unless unutilized resources are available.

Cell congestion in the wireless RANs of LTE (and other technologies) present significant challenges in quality of experience (QoE) degradation for mobile users. While an increase in mobile video traffic is one of the main contributors to cell congestions, QoS degradation due to the congestion may also be drastic for mobile video users. Fast congestion detection is therefore an important but difficult challenge. While standard 3GPP TR23.705 discusses a variety of standardization options for reporting and managing congestion in the wireless RAN and core to combat QoE issues, 3GPP TR23.705 and other related standards do not describe an actual process for detecting congestion.

Fast (within seconds) congestion detection is particularly important in providing opportunities for significant improvement in congestion mitigation and reduction in the end user QoE impact. However, providing such fast detection can be challenging. Existing congestion detection mechanisms utilizing monitoring that is external to eNB traffic may not detect congestion quickly enough, as this type of detection may require a time period of 1 minute or longer before congestion is detected. This length of delay in detection time will generally adversely impact the end user QoE, especially in the case of mobile video applications.

Existing mechanisms of cell congestion detection using the measures such as UE throughput, a number of UEs being served, or percentage of cell load, may not be adequate, for the following reasons. Detecting cell congestion based upon UE throughput is inadequate, since UE throughput in wireless networks is usually also a function of channel conditions, whereas cell congestion detection should not depend upon channel conditions of individual UEs. Detecting cell congestion based upon an increased number of active UEs being served is inadequate, as many UEs may be passing very light traffic and therefore this measure may not have a significant impact on an amount of throughput that an additional UE joining the cell may receive. Detecting cell congestion based upon an increased percentage of cell load is inadequate, as one or two users in an LTE network may fully load the cell due to amount of traffic that these users are monopolizing through heavy downloading, thereby skewing a true measure of cell congestion. Conventional network congestion end-to-end detection mechanisms based upon end-to-end packet loss or packet delay may cause too many false positives if used to detect cell congestion, due to variability of wireless channel conditions that also skew cell congestion detection.

SUMMARY OF INVENTION

At least one example embodiment relates to a method of mitigating cell congestion.

In one example embodiment, the method includes obtaining, by one or more processors of at least one network node, bearer metrics for one or more bearers; classifying, by the one or more processors, the one or more bearers into bearer types using the bearer metrics in order to obtain bearer type information; monitoring, by the one or more processors, the one or more bearers for type-specific anomalies based on the bearer type information to obtain anomaly data; detecting, by one or more processors, congestion based on the anomaly data to obtain congestion information; and exporting, by the one or more processors, the congestion information to a node processor of a network node to mitigate network congestion In one example embodiment, the exporting includes exporting the congestion information to at least one of a node processor running an application function, a node processor of an e-Node B, a node processor of a user equipment, and a node processor of a management entity node that mitigates network congestion.

In one example embodiment, the obtaining of the bearer metrics includes obtaining radio link protocol (RLC) buffer size information and physical resource block (PRB) utilization information.

In one example embodiment, the obtaining of the bearer metrics further includes obtaining transmission burst interval information, the transmission burst interval information including information on time intervals between successive time periods when a RLC buffer is empty.

In one example embodiment, the classifying the one or more bearers into bearer types includes classifying the bearers into one of a Type I bearer and a Type II bearer, the Type I bearers display bursty data transfer behavior, and the Type II bearers display continuous stream data transfer behavior.

In one example embodiment, the monitoring includes, comparing a time period between consecutive occurrences of an empty RLC buffer against a second threshold value if a particular bearer is the Type I bearer.

In one example embodiment, the monitoring includes, comparing an average RLC buffer size of the particular bearer against a first threshold value, if a particular bearer is the Type II bearer.

In one example embodiment, the monitoring includes, comparing an average PRB utilization to a third threshold value, if the particular bearer is one of the Type I bearer and the Type II bearer.

In one example embodiment, the anomaly data includes at least one of a channel condition, an average number of assigned physical resource blocks (PRBs), a severity of an anomaly expressed as a value, a value of a configured parameter, and a total number of bearers served by a cell.

In one example embodiment, the detecting of congestion includes detecting if a weighted sum of a discrimination function of each bearer is positive, the discrimination function being a function of an average physical resource block (PRB) allocation, a bearers location within a cell, and a channel condition.

In one example embodiment, the detecting detects congestion if a fraction of bearers with a detected anomaly exceeds a threshold.

At least one example embodiment relates to a network node.

In one example embodiment, the network node includes one or more processors configured to, obtain bearer metrics for one or more bearers, classify the one or more bearers into bearer types using the bearer metrics in order to obtain bearer type information, monitor the one or more bearers for type-specific anomalies based on the bearer type information to obtain anomaly data, detect congestion based on the anomaly data to obtain congestion information; and export the congestion information to a network node to mitigate network congestion.

In one example embodiment, the one or more processors is further configured to export the congestion information by exporting the congestion information to at least one of a node processor running an application function, a node processor of an e-Node B, a node processor of a user equipment, and a node processor of a management entity node that mitigates network congestion.

In one example embodiment, the one or more processors is further configured to obtain the bearer metrics by obtaining radio link protocol (RLC) buffer size information and physical resource block (PRB) utilization information.

In one example embodiment, wherein the one or more processors is further configured to obtain the bearer metrics by obtaining transmission burst interval information, the transmission burst interval information including information on time intervals between successive time periods when a RLC buffer is empty.

In one example embodiment, the one or more processors is further configured to classify the one or more bearers into bearer types by classifying the bearers into one of a Type I bearer and a Type II bearer, the Type I bearers display bursty data transfer behavior, and the Type II bearers display continuous stream data transfer behavior.

In one example embodiment, the one or more processors is further configured to monitor the one or more bearers for type-specific anomalies by, comparing a time period between consecutive occurrences of an empty RLC buffer against a second threshold value, if a particular bearer is the Type I bearer.

In one example embodiment, the one or more processors is further configured to monitor the one or more bearers for type-specific anomalies by, comparing an average RLC buffer size of the particular bearer against a first threshold value, if a particular bearer is the Type II bearer.

In one example embodiment, the one or more processors is further configured to monitor the one or more bearers for type-specific anomalies by, comparing an average PRB utilization to a third threshold value, if a particular bearer is one of the Type I bearer and the Type II bearer.

In one example embodiment, the anomaly data includes at least one of a channel condition, an average number of assigned physical resource blocks (PRBs), a severity of an anomaly expressed as a value, a value of a configured parameter, and a total number of bearers served by a cell.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 1 illustrates a conventional $3^{rd}$ Generation Partnership Project Long-Term Evolution (3GPP LTE) network;

FIG. 2 illustrates a conventional E-UTRAN Node B (eNB);

FIG. 3 illustrates a reconfigured e-Node B, in accordance with an example embodiment;

FIG. 4 is a method of fast congestion detection, in accordance with an example embodiment;

FIG. 5 depicts an example of detected congestion related anomaly in a radio link control (RLC) buffer of an eNB for a Type II bearer (downlink File Transfer Protocol (FTP) traffic), in accordance with an example embodiment;

FIG. 6 depicts an example of detected congestion related anomaly in a radio link control (RLC) buffer of an eNB for a Type I bearer (downlink HTTP Adaptive Streaming (HAS) traffic), in accordance with an example embodiment;

FIG. 7 depicts an example of a detected congestion related anomaly in physical resource block (PRB) utilization of an eNB for a Type 1 bearer (downlink HAS traffic), in accordance with an example embodiment;

FIG. 8 illustrates a reconfigured 3GPP LTE network, in accordance with an example embodiment; and FIG. 9 illustrates another reconfigured 3GPP LTE network, in accordance with an example embodiment.

DETAILED DESCRIPTION

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium, such as a non-transitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

General Methodology:

In order to provide fast detection of congestion, an aggregate view of time series data analysis of per bearer Radio Link Control (RLC) buffer size (also referred to as "buffer occupancy") and Physical Resource Block (PRB)

utilization data may be utilized. This information is available at an eNB. The general methodology includes three basic steps, and described below.

Step 1: Collecting and monitoring per bearer metrics of interest at eNB may be performed. Collection of this information may include a Radio Link Control (RLC) buffer size and a utilization of Physical Resource Blocks (PRB) that are allocated by the eNB scheduler. This information may be used to compute relevant statistics to accurately and quickly characterize bearer behavior and overall cell performance.

Step 2: Performing per bearer detection of behavioral change (anomalies) that may serve as a congestion indicator using statistical hypothesis tests based on three variables: 1) a RLC buffer size, 2) a transmission burst interval, that is a time interval between two successive time units when the RLC buffer is empty, and 3) a number of assigned PRBs over a given time interval. For each bearer, anomaly behavior may be detected via the combined function of the three individual hypothesis tests.

Step 3: The cell congestion may be detected using a joint hypothesis test involving computing a weighted sum of the discriminate function of the hypothesis tests for individual bearers. Weights may be calculated based upon a dynamic measure of significance of the corresponding bearer.

Generally, this methodology may be best applied to "best-effort" bearers (i.e., bearers that do not have a guaranteed bit rate), as the impacts of network congestion on the above-mentioned variables are more significant than bearers that enjoy a guaranteed bit rate.

FIG. 3 illustrates a reconfigured e-Node B (eNB) 105a, in accordance with an example embodiment. In particular, the reconfigured eNB 105a may include the addition a fast congestion detection function (FCDF) 240, which may interface with scheduler 215, RLC buffers 230 and the backhaul interfaces 235. Specifically, FCDF 240 may include the following components: a bearer metric collector (BMC) 250, a bearer anomaly detector (BAD) 260, a congestion detector (CD) 270, and a congestion reporter (CR) 280. The function of the components of the FCDF 240 components is defined and explained with regard to the flowchart of FIG. 4, described below.

FIG. 4 is a method of fast congestion detection, in accordance with an example embodiment. The discussion of FIG. 4 refers to the function of the components of FCDF 240, shown in FIG. 3. Also, for simplicity sake, the discussion of FIG. 4 indicates that processor 210a performs the various method steps. However, it should be understood that additional processors may instead, or alternatively, perform some or all of the steps. For instance, as described above, more than one processor may exist in eNB 105a. Additionally, a separate processor may be included in a stand-alone server (such as FCDF manager 246, described below), where the separate processor performs the steps associated with CD 270 and CR 280. Further, as indicated herein, FCDF 246 may be located in another existing network node that is not stand-alone server, in which case one or more processors within that existing network node may perform some of the steps of FIG. 4.

Functions performed by a processor 210a (and other "processors," defined herein) may be implemented using hardware. Such example hardware may include one or more Central Processing Units (CPUs), digital signal processors (DSPs), application-specific-integrated-circuits, field programmable gate arrays (FPGAs) computers or the like. The term processor shall be used throughout the document to refer to any such example implementation.

In step S400, processor 210a may cause BMC 250 to collect per bearer metrics including: an average RLC buffer size over a time period T from buffers 230, a PRB utilization from scheduler 215, and compute transmission burst intervals from the collected RLC buffers sizes and PRB utilization data.

Specifically, for a set of the bearers of interest $\mathcal{K}$, a sequence of collected data may include RLC buffer sizes and number of allocated PRBs of a bearer $k \in \mathcal{K}$ may be measured at the radio link control/media access control (RLC/MAC) layer (including RLC buffers 230 and scheduler 215) over time T, denoted by $R_k := \{r_k(n): n=0, 1, \ldots\}$ and $P_k := \{p_k(n): n=0, 1, \ldots\}$, respectively. This information may be obtained every fixed time unit, which may be equal to a Transmission Time Interval (TTI) at which the scheduler 215 may schedule transmissions. TTI may be a short period of 1 milliseconds, for instance. Time T may be configured to be a time interval of T time units between tens of milliseconds to seconds in duration (e.g. T=50 msec, or T=300 msec, or T=1000 msec). Based on the information collected in step S400, in step S410, processor 210a may cause BAD 260 to classify the bearers of eNB 105a into bearer types to obtain bearer type information for bearers. This may be accomplished by recognizing that data traffic of different bearer types follow distinct patterns involving at least three variables that may be determined from the measured radio link protocol (RLC) buffer size and the number of allocated PRBs: 1. an averaged RLC buffer size over T time units, 2. a time interval between two successive time slots when RLC buffer is empty, and 3. an averaged number of allocated PRBs over time period T (hereafter, the three variables for bearer k are abbreviated as $X_k^1$, $X_k^2$, $X_k^3$ respectively). Variable $X_k^1$ may be an indicator of congestion status, as network congestion generally causes an increase in RLC buffer size, especially for a best-effort bearer. Variable $X_k^2$ may indicate a frequency between successive empty RLC buffers, which typically follows distinct pattern depending on a mode of resource consumption by an application being run by UE 110. Variable $X_k^3$ may indicate a resource allocation by a fair scheduler over time interval T. The behavior of these three variables may display a distinct congestion pattern, as shown in FIGS. 5-7, described below.

Based on the collected information of sequences $R_k$ and $P_k$ during a time unit m, the sequences $X_k^i$, i=1, 2, 3 may be computed as follows $$X_k^i := \{x_k^i(m): m = 1, 2, \ldots\} \quad \text{Equation 1}$$
for
$i = 1, 2, 3$ $$x_k^1(m) := \frac{\sum_{n=m-T+1}^{m} r_k(n)}{T} \quad \text{Equation 2}$$

Where $x_k^1(m)$ is average size of the RLC buffer over time interval of duration T that ends at the measuring time point m.

$$x_k^2(m) := \hat{n} - \hat{\hat{n}}, \text{ where } \hat{n} = \text{argmax}_{n \leq m, n \in \mathbb{N}} \{r_k(n)=0\}$$
$$\text{and } \hat{\hat{n}} = \text{argmax}_{n < \hat{n}, n \in \mathbb{N}} \{r_k(n)=0\}, \quad \text{Equation 3}$$

Where $x_k^2(m)$ is the time interval between two successive time slots of empty RLC buffers, $$x_k^3(m) := \frac{\sum_{n=m-T+1}^{m} p_k(n)}{T},$$ Equation 4

Where $x_k^3(m)$ is the average number of allocated PRBs over the time interval of duration T that ends at the measuring time point m.

Measurements of $R_k$ and $P_k$ may be collected at small time scales such as 1 ms time unit increments. Detection based on the sequence $X_k^i$, i=1, 2, 3 may also be applied at larger time scales with averages over T time units according to a network operator's preference, as a tradeoff will exist between computational cost and detection sensitivity.

To detect normal behavior, a probability density function may be used for the three variables, $X_k^1$, $X_k^2$, $X_k^3$. Depending on a network operator's requirements related to computational costs, various methods for probability density estimation may be used. For instance, the use of a histogram, a well-known parametric density estimation using Maximum Likelihood Estimation, and a non-parametric density estimation such as kernel density estimation, may be used to depict and analyze probability density.

In one example embodiment, bearers may be classified into two types. Type I bearers may display a behavior considered to be "bursty," defined by time periods of large volume data transmission separated by idle time periods where the RLC buffer is cleared (where the idle time period may be 50 or more milliseconds). Examples of Type I bearers are HTTP Adaptive Streaming (HAS) video (defined by segment downloads that are followed by short idle periods corresponding to a time when a next segment is being requested), web browsing (defined by a web page download from multiple links, followed by relatively longer idle periods), and other applications associated with sequential downloads that are relatively small (involving single megabyte to tens of megabytes files). Meanwhile, Type II bearers may display behavior associated with a continuous stream of data for reasonably long periods of time (ranging from high single seconds to tens of seconds). Examples of Type II bearers include File Transfer Protocol (FTP) data transmission applications of large files, progressive download video, real time conversational or broadcast IPTV video over UDP, etc.

Additional types of bearer behavior may be introduced as a combination of the two types of bearers described above (using weighted sum based characteristics, for instance).

In step S420, processor 210a may cause BAD 260 to monitor bearer type-specific anomalies. Bearers carrying heavy traffic may be classified into several types. Each one of these types under congestion condition exhibits distinct behavioral anomalies, based on variables $X_k^1$, $X_k^2$, $X_k^3$.

The following examples C1, C2, C3 (listed below) show typical behavioral changes for variables $X_k^1$, $X_k^2$, $X_k^3$ for the two types of bearers under congestion conditions.

C1—$X_k^1$ Changes Under Congestion for the Type II Bearer:

For the Type II bearers, network congestion typically leads to a significant increase in averaged RLC buffer size. FIG. 5 shows an example graph of averaged RLC buffer size over time of a bearer carrying downlink large file FTP traffic. Network congestion occurs after the 120th second due to an increased number of new users and associated bearers. The behavioral change associated with the congestion may be manifested by an increased averaged RLC buffer size.

C2—$X_k^2$ Changes Under Congestion for the Type I Bearer:

RLC buffer size follows a periodical, frequent pattern that oscillates between being empty, and being at a certain maximal value. When the network becomes congested, the time period between two consecutive occurrences of an empty RLC buffer significantly increases to an abnormal value. FIG. 6 shows an example of an averaged RLC buffer size for a bearer over time carrying downlink HAS traffic. Network congestion occurs after the 120th second due to an increased number of new users and associated bearers. The behavioral changes associated with congestion are manifested by a lower frequency of oscillation of RLC buffer size and a longer period of time between empty RLC buffers.

C3—$X_k^3$ Changes Under Congestion for Both Type I and Type II Bearers:

For both bearer Type I and Type II, network congestion may lead to a significant reduction in average PRB utilization due to less resources being allocated by a fair scheduler. FIG. 7 shows an example of an average PRB utilization over time for a bearer carrying downlink HAS traffic. Network congestion occurs after the 120th second due to an increased number of new users and associated bearers. Congestion causes an averaged number of PRBs assigned to the bearer to decrease to a significantly lower value.

In one embodiment, the hypothesis test may be applied to the congestion symptoms shown in FIGS. 5-7. The objective of the hypothesis test is to reliably detect an abnormal state even if a priori knowledge of a fault state is unknown. In one embodiment, for a kth bearer of interest, consider sequence $X_k^i=(x_k^i(n): n=1, 2, \ldots, N)$, i=1, 2, 3, the ith sequence $X_k^i$ obeys one of the two statistical hypotheses.

$$\mathcal{H}_0^{k,i}: x_k^i(n) \sim P_0^{k,i}, n = 1, 2, \ldots, N$$ Equation 5

$$\mathcal{H}_1^{k,i}: x_k^i(n) \sim \overline{P_0^{k,i}}, n = 1, 2, \ldots, N$$

In Equation 5, $P_0^{k,i}$ is a probability distribution of a healthy/normal state of the ith variable of the kth bearer of interest, and $\overline{P_0^{k,i}}$ is the complement of $P_0^{k,i}$. In one embodiment a decision rule $\Lambda_{k,i}$ is a set of sequence $X_k^i$ such that if $X_k^i \in \Lambda_{k,i}$, then $X_k^i$ is classified under the $\overline{P_0^{k,i}}$ (abnormal state), otherwise $X_k^i$ is under the distribution $P_0^{k,i}$ (healthy state). In one embodiment, there are two types of the errors (Type A and Type B), described below:

Type A (false positive): Let $P_0^{k,i}(\Lambda_{k,i})$ denote the probability of deciding $P_{k,i}=\overline{P_0^{k,i}}$ while $P_0^{k,i}$ is true.

Type B (misdetection): Let $\overline{P_0^{k,i}}(\overline{\Lambda}_{k,i})$ denote the probability of deciding $P_{k,i}=P_0^{k,i}$ while $\overline{P_0^{k,i}}$ is true, where $\overline{\Lambda}_{k,i}$ denotes the complement of $\Lambda_{k,i}$.

Due to a tradeoff between the two types of error probabilities, both types of error cannot be minimized at a same time. According to the hypothesis, a sample $x_k^i(n)$ either belongs to $P_0^{k,i}$ or $\overline{P_0^{k,i}}$. In one example embodiment, a simple discriminant function may be utilized to constrain the type A error probability. For the kth bearer of interest, the discriminant function of the individual hypothesis test on the ith variable may be described as follows.

$$h_{k,i}(x_k^i(n), \delta_{k,i}) = |x_k^i(n) - E(X_k^i)| - \sqrt{\frac{V(X_k^i)}{\delta_{k,i}}},$$ Equation 6

-continued for $i = 1, 2, 3, k \in \mathcal{K}$

The $h_{k,i}(x_k^i(n), \delta_{k,i})$ represents a measure of significance of the difference between the measured value of the variable $x_k^i(n)$ and its expected value. If the value of Equation 6 is positive, the difference is significant, otherwise it is not.

In Equation 6, $E(X_k^i)$ and $V(X_k^i)$ denotes the expectation and the variance of the sequence $\{x_k^i(m): m=n-M, \ldots, n-1\}$ learned by the step of statistics process respectively, M is a configured parameter that determines the sliding window size for learning the model from the history, and $\delta_{k,i}$ denotes the predefined bearer- and variable-specific threshold for the type A error probability.

Based on this discriminant function, the hypothesis test for each bearer k and the i-th variable $X_k^i$ may be described as the following combination of two conditions. For the first two variables representing measurements of RLC buffers size and the data burst time periods, the measured values of variables differ significantly from the expected values and are greater than the expected values. For the third variable representing the PRB utilization the measured values differ significantly from the expected values and are less than the expected values. This is represented by the following Equation 7:

$$\mathcal{H}_1^{k,i} = 1, \quad \text{Equation 7}$$

if $$\begin{cases} h_{k,i}(x_k^i(n), \delta_{k,i}) > 0 \text{ and } x_k^i(n) > E(X_k^i), & \text{for } i = 1, 2 \\ h_{k,i}(x_k^i(n), \delta_{k,i}) > 0 \text{ and } x_k^i(n) < E(X_k^i), & \text{for } i = 3 \end{cases}$$

The above hypothesis tests provide the criterion under which the hypothesis $\mathcal{H}_1^{k,i}=1$ (abnormal state that indicates the congestion status) is accepted. In another example embodiment, additional conditions of increasing averaged RLC buffer size and decreasing averaged number of assigned PRBs may make the detection of congestion more robust. In one embodiment, the discriminant function described in Equations 6 and 7 may use a weighted sum of the variables $X_k^i$.

It should be understood that a bearer may be either a Type I or a Type II bearer, but not both. For an individual bearer which falls into either of the two types, only one of C1 and C2 appears. In other words, only one of the tests between $h_{k,1}$ and $h_{k,2}$ returns a positive value under a congestion state. On the other side, since both types suffer from C3 under a congestion state, the tests of both types return a positive value for $h_{k,3}$.

In another example embodiment a discriminant function for the $k^{th}$ bearer may be defined as follows.

$$h_k = \alpha_k \cdot \max\{h_{k,1}(x_k^1(n), \delta_{k,1}), h_{k,2}(x_k^2(n), \delta_{k,2})\} + (1-\alpha_k) \cdot h_{k,3}(x_k^3(n), \delta_{k,3}) \quad \text{Equation 8}$$

The above discriminant function takes the convex combination of $h_{k,3}(x_k^3(n), \delta_{k,3})$ and the maximum value between $h_{k,1}(x_k^1(n), \delta_{k,1})$ and $h_{k,2}(x_k^2(n), \delta_{k,2})$. The hypothesis test may be defined as follows.

$$\mathcal{H}_1^{k,i} = 1, \quad \text{Equation 9}$$

-continued if $$\begin{cases} h_k > 0 \text{ and} \\ x_k^3(n) < E(X_k^3) \text{ and} \\ x_k^2(n) > E(X_k^2) \text{ if } \operatorname{argmax}_{i=1,2}\{h_{k,i}(x_k^i(n), \delta_{k,i})\} = 2 \end{cases}$$

In step S430, processor 210a may cause BAD 260 to check whether the bearer exhibits behavioral anomalies based upon the collected data. In one example embodiment, such a check may be performed periodically (every time interval T1, where T1 may be for example configured to be between 3 and 20 seconds). In another example embodiment, such a check may be performed every time interval T, where T is described earlier. In one example embodiment, the anomaly may be detected if the condition $\mathcal{H}_1^k=1$ in the Equation 7 is met. In another example embodiment, the anomaly is detected if the condition $\mathcal{H}_1^k=1$ in the Equation 9 is met.

If the bearer behavior anomaly is detected, processor 210a may cause BAD 260 (in step S440) to report the bearer type, the detected anomaly, and additional 'anomaly data' to CD 270. In one embodiment, the additional 'anomaly data' may include for example channel conditions of the bearer k (for example, average assigned MCS, average SINR), an average number of PRBs assigned to this bearer k, a severity of an anomaly expressed as an amplitude (value) of the $h_{k,i}(x_k^i(n), \delta_{k,i})$, the values of the configured parameters (e.g. M in the Equation 6, and $\alpha_k$ in Equation 8), and a total number of bearers served by the cell.

If in step S430 the bearer anomaly is not detected, the processing repeats from the step S400. Otherwise, BAD 260 reports the bearer type, the detected anomaly, and the additional 'anomaly data' (as defined above) to CD 270.

In step S450, processor 210a may cause CD 270 to collect the reported anomalies and additional 'anomaly data' for bearers served by the cell.

In step S460, processor 210a may cause CD 270 to perform a 'joint hypothesis test' by computing a weighted sum of the discriminate function of the hypothesis tests of the individual bearers. Two example embodiments are provided for the joint test for the cell congestion state.

In one example embodiment, the criteria may be based upon a weighted combination of the individual tests. The cell congestion state may be detected if the weighted sum of the discriminant function in the individual bearer tests is positive.

$$\mathcal{H}_1 = 1, \text{ if } \Sigma_{k \in \mathcal{K}} \gamma_k \tilde{h}_k > 0 \quad \text{Equation 10}$$

In Equation 10, $$\tilde{h}_k = \begin{cases} h_k \cdot \mathcal{H}_1^k \text{ if } h_k \geq 0 \\ h_k \text{ if } h_k < 0 \end{cases}$$

and $\gamma_k = (\alpha_k * \beta_k)$ is a bearer-specific weight factor depending on the significance and reliability of the bearers, where $\alpha_k$ is a monotone increasing function of the averaged PRB allocation $f(E(X_k^3))$ (that is, the bearer k with higher PRB allocation has a higher value of the weight $\alpha_k$). In one example embodiment, $\beta_k$ is a function depending on the UE 110 that receives or sends the data that is carried by a bearer's location geometry and channel conditions (e.g. an averaged distance from the cell center and/or averaged SINR). In one example embodiment, bearers carrying data of the UEs 110 located in the cell center or with better SINR may be assigned larger weights $\beta_k$ due to the observation that behavioral anomalies for the functions above are more pronounced under better channel conditions, while bearers carrying data for the UEs 110 located at the cell edge or under worse channel conditions are assigned smaller weights.

Normalization may be accomplished after the weight function is chosen such that the constraint $\Sigma_{k \in \mathcal{K}} \gamma_k = 1$ holds.

In another example embodiment, the criteria may be based upon a simplified version of the test: cell congestion may be detected if the fraction of significant bearers with detected abnormal behavior exceeds a threshold $\mu$. The bearers may be considered significant if their dynamically measured averaged PRB utilization $E(X_k^3)$ exceeds a significance threshold.

$$\mathcal{H}_1 = 1, \quad \text{Equation 11}$$
if
$$\frac{\sum_{k \in \mathcal{K}} 1_{\{\mathcal{H}_1^k = 1\}}}{|\mathcal{K}|} \geq \mu$$

In Equation 11, $1_{\{X\}}$ may denote an indicator function which may return a value of 1 if event X is true, and return a value of 0, otherwise. The symbol |•| is a cardinality function, and $\mu \in (0,1)$ may be a configured threshold chosen between 0 and 1, where $$\frac{\sum_{k \in \mathcal{K}} 1_{\{\mathcal{H}_1^k = 1\}}}{|\mathcal{K}|}$$

may be a mathematical expression for a fraction of significant bearers that may be detected to have abnormal behavior. For example, if $\mu$ is configured to be 0.5, the cell congestion may be detected based upon a simple majority of significant bearers with the detected abnormal behavior.

In Step S470, processor 210a may cause CD 270 to detect congestion for eNB 105a based upon the joint hypothesis test performed in step S460. In one example embodiment, the eNB 105a may be determined to be congested if $\mathcal{H}_1 = 1$ in Equation 10. In another example embodiment, the eNB 105a may be determined to be congested if $\mathcal{H}_1 = 1$ in Equation 11.

In step S480, processor 210a may cause CD 270 to command CR 280 to produce a congestion report. The report may be transmitted from eNB 105a via backhaul interface 235 to other network nodes or a network central office in order to notify a network operator that action shall be taken in order to alleviate the detected network congestion. The described method of congestion detection may work with any kind of reporting mechanism. The reporting mechanism may be configured by a network operator. In one example embodiment, CR 280 may report congestion to one of the entities described in the 3GPP TR23.705, e.g. RCAF (RAN Congestion Awareness Function); RCAF may then further take appropriate steps to mitigate congestion. In another example embodiment, CR 280 may report congestion directly to PCRF 106 and/or PGW 103. The PCRF 106 and PGW 103 may take appropriate steps to mitigate congestion. The CD 270, the PCRF 106 and the PGW 103 may be considered "management entities" of the network. In one example embodiment, steps to mitigate the detected congestion may be implemented as described in 3GPP TR 23.705. In one example embodiment, congestion mitigation may be performed by the functions within RAN or ePC core.

In one example embodiment of congestion mitigation, a processor of PCRF 106 may instruct PGW 103 to limit bandwidth for specific downlink flows that may be destined for a congested cell. In another example, a processor of the PCRF 106 may instruct PGW 103 to mark a drop priority order for specific packets that may be dropped. Subsequently, eNB 105a may drop the marked packets in an order of a marked dropping priority, when PDCP buffers overflow due to eNB 105a congestion. In yet another embodiment, a processor of PCRF 106 may start limiting or rejecting authorization of new flow creation at a congested cell. In yet another embodiment, a processor of PCRF 106 may instruct PGW 103 to start marking a priority of individual flows based upon configured policies or subscriber service level agreements. Under congestion conditions, based upon the markings priorities, the eNB 105a may prioritize packet placement of the marked flows in downlink buffers, and scheduler 210 may prioritize scheduling of the marked flows.

In another example embodiment, congestion may also be reported to an Application Function (AF) (not shown) located either in the UE 110, or in the IP-PDN network 1001. Upon a notification of congestion, the AF may further adapt application behavior to the congestion. In one example embodiment, HAS application clients may select lower video encoding rates for requested segments under congestion. In another example embodiment, a HAS content server may limit rates of segments that may be sent in response to HAS client requests under congestion. In yet another example embodiment, live video conferencing application may select lower video encoding rates for filmed video that is sent to an application peer experiencing congestion. In yet another example embodiment, an FTP application may schedule file download for a later time when a network is not congested. In another example embodiment, CR 280 may report the detected congestion back to the scheduler 215, and upon congestion notification the scheduler 215 may further adapt resource allocation to alleviate an impact of the congestion on the end user QoE. In one example embodiment, a weighted fair scheduler may adjust weights to prioritize flows that may be marked by the PGW 103.

FIG. 8 illustrates a reconfigured 3GPP LTE network 10a, in accordance with an example embodiment. The network 10a includes the same network components as shown in network 10 of FIG. 1. However, IP-CAN 100a of network 10a may include a reconfigured eNB 105a with a FCDF 240, as described in FIGS. 3 and 4. FCDF 240 may transmit the detected congestion notification to PCRF 106 (as shown), PGW 103, or other functions within IP-CAN 100a, as described for instance in 3GPP TR 23.705.

FIG. 9 illustrates another reconfigured 3GPP LTE network 10b, in accordance with an example embodiment. The network 10b may include the same network components as shown in network 10a of FIG. 8. However, rather than reconfiguring an eNB to include all of the FCDF 240 components in eNB 105b, as shown in FIG. 3, the FCDF 240 components may instead be divided such that some of the components are included in eNB 105b, and some of the components are included in a FCDF manager 246. Specifically, eNB 105b may include a FCDF agent 241 that may include the BCM 250 and BAD 260. The FCDF manager 246 may therefore include the remaining CD 270 and CR 280. It should be understood that BCM 250, BAD 260, CD 270 and CR 280 perform the same functions and operate in the same manner as these components were described in conjunction with FIGS. 3 and 4.

The FCDF manager 246 may be a dedicated, stand-alone node, or the FCDF manager 246 may instead be included in an existing network node within IP-CAN 100b, such as being located in PCRF 106, SGW 101, PGW 103, or MME 108. The closer the FCDF manager 246 is to FCDF agent 241, the more effectively FCDF manager 246 and FCDF agent 241 may work together to quickly detect network 10b congestion without unnecessary latency. For this reason, FCDF manager 246 should be located proximally close to eNB 105b, to the extent possible.

It should be understood that while example embodiments place the FCDF 240 functional components within eNB 105a, in a virtual RAN or software defined networks architecture where functional components of the eNB 105a may be distributed and dynamically instantiated within a cloud of general purpose computing nodes, the FCDF 240 functional components may be likewise distributed and dynamically instantiated within a cloud of general purpose computing nodes.

It should be understood that while the example embodiments refer to a LTE network, these embodiments could also be applied to other wireless access networks where wireless resources used to transmit data traffic are allocated by a corresponding wireless access technology scheduler and stored in buffers prior to being transmitted over the air. Examples of such technologies include but not limited to 3GPP WCDMA, UMTS, 3GPP2 EVDO, WiMAX.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of mitigating cell congestion, comprising:
   obtaining, by one or more processors of at least one network node, bearer metrics for one or more bearers;
   classifying, by the one or more processors, the one or more bearers into bearer types using the bearer metrics in order to obtain bearer type information;
   monitoring, by the one or more processors, the one or more bearers for type-specific anomalies based on the bearer type information to obtain anomaly data;
   detecting, by one or more processors, congestion based on the anomaly data to obtain congestion information; and
   exporting, by the one or more processors, the congestion information to a node processor of a network node to mitigate network congestion.

2. The method of claim 1, wherein the exporting includes exporting the congestion information to at least one of a node processor running an application function, a node processor of an e-Node B, a node processor of a user equipment, and a node processor of a management entity node that mitigates network congestion.

3. The method of claim 1, wherein the obtaining of the bearer metrics includes obtaining radio link protocol (RLC) buffer size information and physical resource block (PRB) utilization information.

4. The method of claim 3, wherein the obtaining of the bearer metrics further includes obtaining transmission burst interval information, the transmission burst interval information including information on time intervals between successive time periods when a RLC buffer is empty.

5. The method of claim 1, wherein,
   the classifying the one or more bearers into bearer types includes classifying the bearers into one of a Type I bearer and a Type II bearer,
   the Type I bearers display bursty data transfer behavior, and
   the Type II bearers display continuous stream data transfer behavior.

6. The method of claim 5, wherein the monitoring includes,
   comparing a time period between consecutive occurrences of an empty RLC buffer against a second threshold value if a particular bearer is the Type I bearer.

7. The method of claim 5, wherein the monitoring includes,
   comparing an average RLC buffer size of the particular bearer against a first threshold value, if a particular bearer is the Type II bearer.

8. The method of claim 5, wherein the monitoring includes,
   comparing an average PRB utilization to a third threshold value, if the particular bearer is one of the Type I bearer and the Type II bearer.

9. The method of claim 1, wherein the anomaly data includes at least one of a channel condition, an average number of assigned physical resource blocks (PRBs), a severity of an anomaly expressed as a value, a value of a configured parameter, and a total number of bearers served by a cell.

10. The method of claim 1, wherein,
    the detecting of congestion includes detecting if a weighted sum of a discrimination function of each bearer is positive,
    the discrimination function being a function of an average physical resource block (PRB) allocation, a bearers location within a cell, and a channel condition.

11. The method of claim 1, wherein,
    the detecting detects congestion if a fraction of bearers with a detected anomaly exceeds a threshold.

12. A network node, comprising:
    one or more processors configured to,
      obtain bearer metrics for one or more bearers,
      classify the one or more bearers into bearer types using the bearer metrics in order to obtain bearer type information,
      monitor the one or more bearers for type-specific anomalies based on the bearer type information to obtain anomaly data,
      detect congestion based on the anomaly data to obtain congestion information; and
      export the congestion information to a network node to mitigate network congestion.

13. The network node of claim 12, wherein the one or more processors is further configured to export the congestion information by exporting the congestion information to at least one of a node processor running an application function, a node processor of an e-Node B, a node processor of a user equipment, and a node processor of a management entity node that mitigates network congestion.

14. The network node of claim 12, wherein the one or more processors is further configured to obtain the bearer metrics by obtaining radio link protocol (RLC) buffer size information and physical resource block (PRB) utilization information.

15. The network node of claim 14, wherein the one or more processors is further configured to obtain the bearer metrics by obtaining transmission burst interval information, the transmission burst interval information including information on time intervals between successive time periods when a RLC buffer is empty.

16. The network node of claim 12, wherein,
the one or more processors is further configured to classify the one or more bearers into bearer types by classifying the bearers into one of a Type I bearer and a Type II bearer,
the Type I bearers display bursty data transfer behavior, and
the Type II bearers display continuous stream data transfer behavior.

17. The network node of claim 16, wherein the one or more processors is further configured to monitor the one or more bearers for type-specific anomalies by,
comparing a time period between consecutive occurrences of an empty RLC buffer against a second threshold value, if a particular bearer is the Type I bearer.

18. The network node of claim 16, wherein the one or more processors is further configured to monitor the one or more bearers for type-specific anomalies by,
comparing an average RLC buffer size of the particular bearer against a first threshold value, if a particular bearer is the Type II bearer.

19. The network node of claim 16, wherein the one or more processors is further configured to monitor the one or more bearers for type-specific anomalies by,
comparing an average PRB utilization to a third threshold value, if a particular bearer is one of the Type I bearer and the Type II bearer.

20. The network node of claim 12, wherein the anomaly data includes at least one of a channel condition, an average number of assigned physical resource blocks (PRBs), a severity of an anomaly expressed as a value, a value of a configured parameter, and a total number of bearers served by a cell.

* * * * *